US010983952B2

(12) United States Patent
Ginzinger et al.

(10) Patent No.: US 10,983,952 B2
(45) Date of Patent: Apr. 20, 2021

(54) METHOD AND SYSTEM FOR STORING DOCUMENTS

(71) Applicant: OPEN TEXT SA ULC, Halifax (CA)

(72) Inventors: Peter Ginzinger, Übersee (DE); Matthias Specht, Gröbenzell (DE); Stefan Ochs, Baldham (DE)

(73) Assignee: OPEN TEXT SA ULC, Halifax (CA)

( * ) Notice: Subject to any disclaimer, the term of this patent is extended or adjusted under 35 U.S.C. 154(b) by 418 days.

(21) Appl. No.: 14/316,579

(22) Filed: Jun. 26, 2014

(65) Prior Publication Data

US 2015/0006957 A1    Jan. 1, 2015

(30) Foreign Application Priority Data

Jul. 1, 2013  (EP) ..................... 13174548

(51) Int. Cl.
*G06F 16/13* (2019.01)
*G06F 16/93* (2019.01)
*G06F 3/06* (2006.01)
*G06F 11/14* (2006.01)
*G06F 16/11* (2019.01)

(52) U.S. Cl.
CPC ............ *G06F 16/13* (2019.01); *G06F 3/0605* (2013.01); *G06F 3/067* (2013.01); *G06F 3/0649* (2013.01); *G06F 11/1469* (2013.01); *G06F 16/122* (2019.01); *G06F 16/93* (2019.01)

(58) Field of Classification Search
CPC ......... G06F 17/30091; G06F 17/30011; G06F 16/27; G06F 16/185; G06F 16/122; G06F 16/21; G06F 16/01
See application file for complete search history.

(56) References Cited

U.S. PATENT DOCUMENTS 8,826,001 B2 *  9/2014  Betz ..................... H04L 63/0428
                                            705/51
9,678,968 B1 *  6/2017  Taylor ................. G06F 11/2089
                        (Continued)

OTHER PUBLICATIONS

European Search Report issued for European Patent Application No. 113 174 548.1, dated Oct. 8, 2013, 7 pages.

*Primary Examiner* — Etienne P Leroux
*Assistant Examiner* — Cindy Nguyen
(74) *Attorney, Agent, or Firm* — Sprinkle IP Law Group

(57) ABSTRACT

Embodiments of systems and methods for storing documents in a cloud storage system comprising a cloud processor and a plurality of storage components are disclosed. Particularly, certain embodiments comprise, at the cloud processor, providing at least one storage component attribute for each of the plurality of storage components, the at least one storage component attribute defining a storage property of the respective storage component; receiving a first document to be stored and document metadata associated with the first document, the document metadata defining storage requirement of the first document; translating the document metadata of the first document into a storage instruction; determining, based on storage component attributes, at least one storage component among the plurality of storage components with a defined storage property matching the storage instruction for the first document; and storing the first document in the at least one storage component determined according to the storage instruction.

20 Claims, 8 Drawing Sheets

(56) References Cited

U.S. PATENT DOCUMENTS

| | | | |
|---|---|---|---|
| 2009/0228669 A1 | 9/2009 | Slesarev et al. | |
| 2010/0332401 A1* | 12/2010 | Prahlad | G06F 17/3002 705/80 |
| 2010/0332479 A1* | 12/2010 | Prahlad | G06F 3/0649 707/741 |
| 2011/0022642 A1* | 1/2011 | deMilo | G06F 17/30082 707/805 |
| 2012/0124014 A1* | 5/2012 | Provenzano | G06F 17/30156 707/692 |
| 2012/0323976 A1 | 12/2012 | Stidworthy et al. | |
| 2013/0262396 A1* | 10/2013 | Kripalani | G06F 17/30289 707/674 |
| 2013/0339643 A1* | 12/2013 | Tekade | G06F 11/1461 711/162 |
| 2014/0089278 A1* | 3/2014 | Lovinger | G06F 17/30194 707/694 |
| 2014/0149983 A1* | 5/2014 | Bonilla | G06F 9/45558 718/1 |
| 2014/0344234 A1* | 11/2014 | Amarendran | G06F 17/30289 707/694 |

* cited by examiner

METHOD AND SYSTEM FOR STORING DOCUMENTS

CROSS-REFERENCE TO RELATED APPLICATION(S)

This application claims priority from European Patent Application No. 13174548.1, filed Jul. 1, 2013, entitled "A METHOD AND SYSTEM FOR STORING DOCUMENTS," which is fully incorporated by reference herein.

TECHNICAL FIELD

The disclosure relates generally to cloud storage. More particularly, this disclosure relates to storing documents in a cloud storage system. Even more specifically, this disclosure relates to a method for storing, and in some instances, archiving documents in a cloud storage system comprising a cloud processor and a plurality of storage components.

BACKGROUND

In general, cloud computing is the use of computing resources, i.e., hardware and software, which are available in a remote location and accessible over a network such as the Internet. In particular, one example of cloud computing is a cloud storage environment which refers to online space used by users to store data. In other words, data is stored remotely.

In a cloud storage environment, a cloud storage service provider provides a certain cloud storage resource as required by a user to store, or also called to archive, data and charges per the required cloud storage resource. From the perspective of the user, storing data in a cloud is however mostly not transparent in terms of the actual storing conditions, since the user usually does not know at which location, at which storage device, and under which further technical, legal and other conditions, etc. the data is actually stored. Thus, the user usually cannot directly determine and control the actual cloud storage device and the storage conditions at which the data is stored.

Therefore, there is a need in the art to address the problem associated with existing cloud storage solutions, in particular with cloud storage solutions related to (public) cloud storage.

SUMMARY

As a method for storing document in a cloud storage system comprising a cloud processor and a plurality of storage components, one embodiment can, for example, comprise, at the cloud processor: providing at least one storage component attribute for each of the plurality of storage components, the at least one storage component attribute defining a storage property of the respective storage component; receiving a first document to be stored and document metadata associated with the first document, the document metadata defining a storage requirement of the first document; translating the document metadata of the first document into a storage instruction; determining, based on storage component attributes, at least one storage component among the plurality of storage components with a defined storage property matching the storage instruction for the first document; and storing the first document in the at least one storage component determined according to the storage instruction.

According to this method, the problems of the prior art can be overcome. In particular, it can be achieved that documents can be stored in the cloud, while meeting the requirements to store the documents described in the document metadata. That is, documents can be stored in storage components of the cloud storage system which match with the storage requirements. In addition, the requirements can be met during the whole lifetime of the documents stored in the cloud storage system.

As a method, one embodiment can, for example, further comprise, at the cloud processor, generating cloud storage information associated with the first document stored in the cloud storage system indicating the at least one storage component at which the first document is stored. Optionally, the cloud storage information associated with the first document can include the document metadata of the first document.

Accordingly, the cloud storage information indicating the location at which the document has been stored can be maintained even in case the location changes. It therefore is not necessary to search for the location of the stored document, rather to refer to the cloud storage information.

As a method, one embodiment can, for example, further comprise: storing the document metadata associated with the first document in the at least one determined storage component.

As a method, one embodiment can, for example, further comprise at the cloud processor: receiving a request indicating a document to be retrieved from the cloud storage system; searching for cloud storage information associated with the document to be retrieved to identify the at least one storage component where the document to be retrieved is stored; and retrieving the document from the at least one identified storage component.

In one example, the step of providing at least one storage component attribute can further comprise, at the cloud processor: requesting the at least one storage component attribute associated with each of the plurality of storage components; and, in response receiving the at least one storage component attribute provided by the respective storage component. Optionally, the step of providing at least one storage component attribute can further comprises, at the cloud processor: storing the at least one storage component attribute received from the respective storage component; and associating the at least one storage component attribute with the respective storage component.

As a method, the determining according to one embodiment can, for example, further comprise: sorting the storage components based on a level of match between the storage property of each storage component and the storage instruction for the first document; and selecting, based on the level of match exceeding a predetermined threshold, the at least one storage component. In one example, the level of match is based at least partially on costs involved when storing the first document in each of the plurality of storage components and/or wherein the predetermined threshold corresponds to the lowest costs involved.

As a method, one embodiment can, for example, further comprise, at the cloud processor: receiving new document metadata to update the originally received document metadata for the first document; translating the new document metadata into a new storage instruction; determining based on the storage component attributes whether the storage property of the at least one storage component where the first document is stored matches with the new storage instruction; and in case of a match, updating the originally received document metadata for the first document with the new document metadata, otherwise determining based on storage component attributes at least one new storage component among the plurality of storage components with a defined storage property matching the new storage instruction and storing the first document in the at least one newly determined storage component. In one example, the method can further comprise, at the cloud processor, updating the cloud storage information associated with the first document to indicate the at least one new storage component where the first document is stored. In addition, storing the first document in the at least one new storage component can, for example, further comprise: searching for cloud storage information associated with the first document; moving the first document from the at least one storage component indicated by the cloud storage information to the at least one new storage component determined; and updating the cloud storage information associated with the first document to indicate the at least one new storage component where the first document is stored.

In one example, translating the document metadata of the first document into the storage instruction can comprise mapping the document metadata to at least one of the storage component attributes of the storage components based on a predefined mapping table, wherein the storage instruction contains the at least one storage component attribute.

As a method, one embodiment can, for example, further comprises, at the cloud processor: determining whether a failure occurs in at least one storage component among the plurality of storage components; searching for cloud storage information indicating a document stored in the at least one storage component where the failure occurs; based on the searching for cloud storage information, determining whether a copy of the document exists, and retrieving document metadata associated with the copy of the document; translating the document metadata of the copy of the document into a storage instruction to restore the document; determining based on storage component attributes at least one storage component of which the storage property matches with the storage instruction to restore the document; restoring the document by copying the copy of the document from the at least one storage component indicated by the cloud storage information to the at least one storage component determined. In one example, the step can be included for updating the cloud storage information associated with the copy of the document to indicate the at least one storage component to which the copy has been copied.

According to other examples, the document metadata comprise at least one service level agreement and/or the plurality of storage components comprises one or more storage components of: a storage layer, storage components of a pool layer and storage components of a hardware layer, each of the layers having at least one storage property defined using the storage component attribute, and/or the storage components of the hardware layer comprises at least one storage device.

Other embodiments of the invention relate to a cloud storage system, a cloud processor, a system for storing documents, and a non-transitory computer readable medium.

According to one further embodiment, a cloud processor for a cloud storage system comprising a plurality of storage components is provided, wherein the cloud processor has means configured to perform functions according to each of the examples of the method described above.

According to another embodiment, a cloud storage system comprising the cloud processor and a plurality of storage components is provided.

According to yet another embodiment, a system for storing documents in a cloud storage system comprising the cloud processor and a plurality of storage components is provided According to another embodiment, a non-transitory computer readable medium is provided. The non-transitory computer readable medium comprises instructions which when executed by a cloud processor in a cloud storage system having a plurality of storage components configure the cloud processor so as to perform the steps of the method described above.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
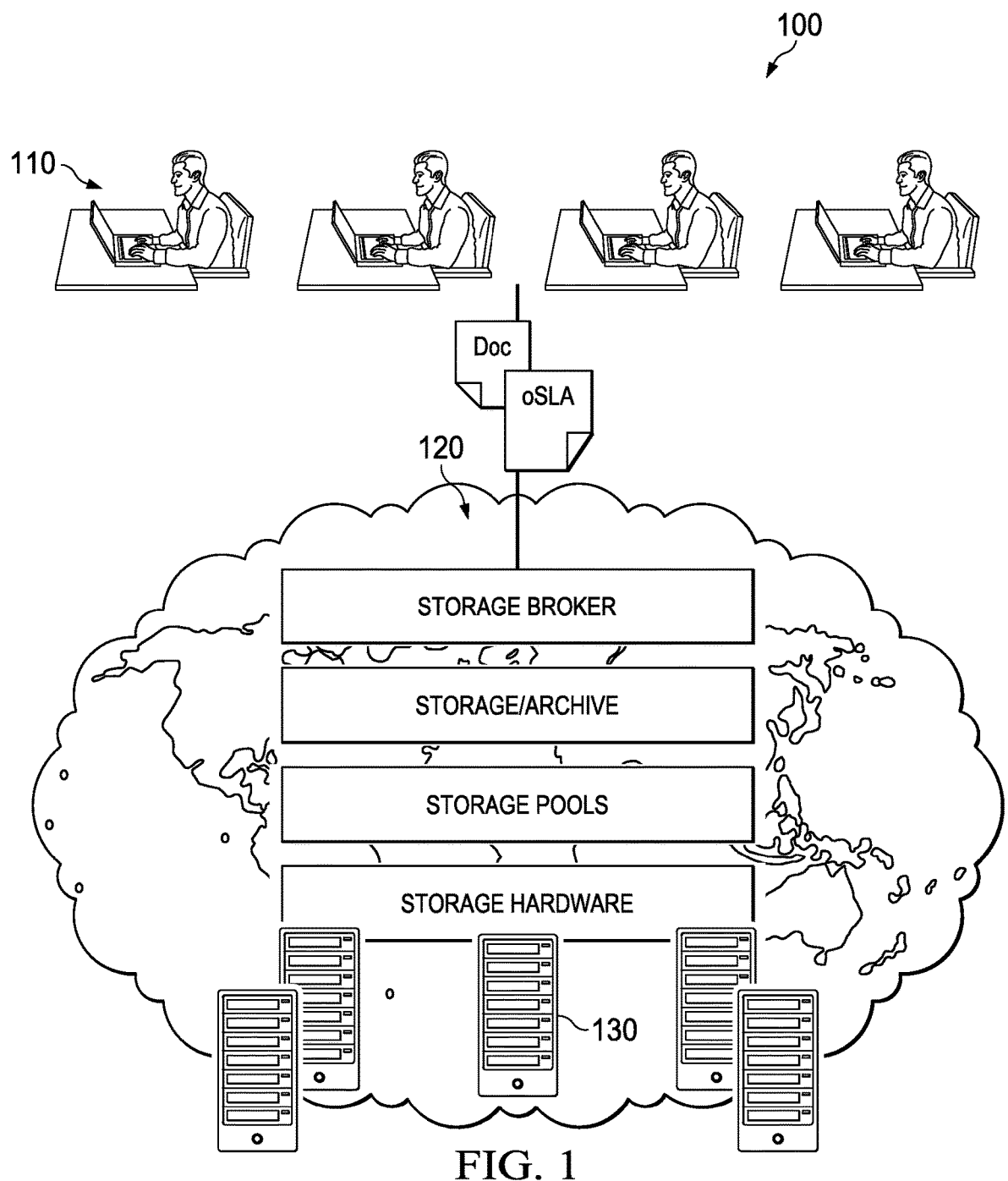
FIG. 1 illustrates the principles of a cloud storage system, according to one embodiment of the invention.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such product, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

Embodiments of the invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device (s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the invention may be implemented on one computer or shared among two or more computers. In one embodiment, the functions of the invention may be distributed in the network. Communications between computers implementing embodiments of the invention can be accomplished using any electronic, optical, ratio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols. It will be understood for purposes of this disclosure that a service is one or more computer processes, computing devices or both, configured to perform one or more functions. A service may present one or more interfaces which can be utilized to access these functions. Such interfaces include APIs, interfaces presented for a web services, remote procedure calls, remote method invocation, etc.

As used herein, the term "store" means to place data in a memory or storage device.

As used herein, the term "archive" means to store data for a longer period of time and/or in secondary storage for the general purpose of data recovery. Secondary storage or archive storage may be generally referred to as storage for data that is a copy of data being worked on or actively updated and data that is saved for backup and recovery purposes.

The invention generally pertains to methods and systems for storing documents in a cloud storage system. It will be appreciated by one of ordinary skill that the methods and systems disclosed hereinforth are suitable for archiving documents in a cloud storage system as well.

Referring to FIG. 1, the cloud or cloud storage system 100 may comprise a cloud processor 120, also referred to as storage broker or SLA broker, and a plurality of storage components 130. The cloud processor 120 and the plurality of storage components 130 are connected using a network, such as a Local Area Network (LAN), a Wide Area Network (WAN), the Internet, or the like. The cloud processor 120 and the storage components 130 may be located at the same location or distributed. A client 110 using a computing device such as a general purpose computer, a smart phone, a tablet computer, or the like is connected to the cloud storage system 100 via a network such as a Local Area Network (LAN), a Wide Area Network (WAN), the Internet, or the like.

Figure 2:
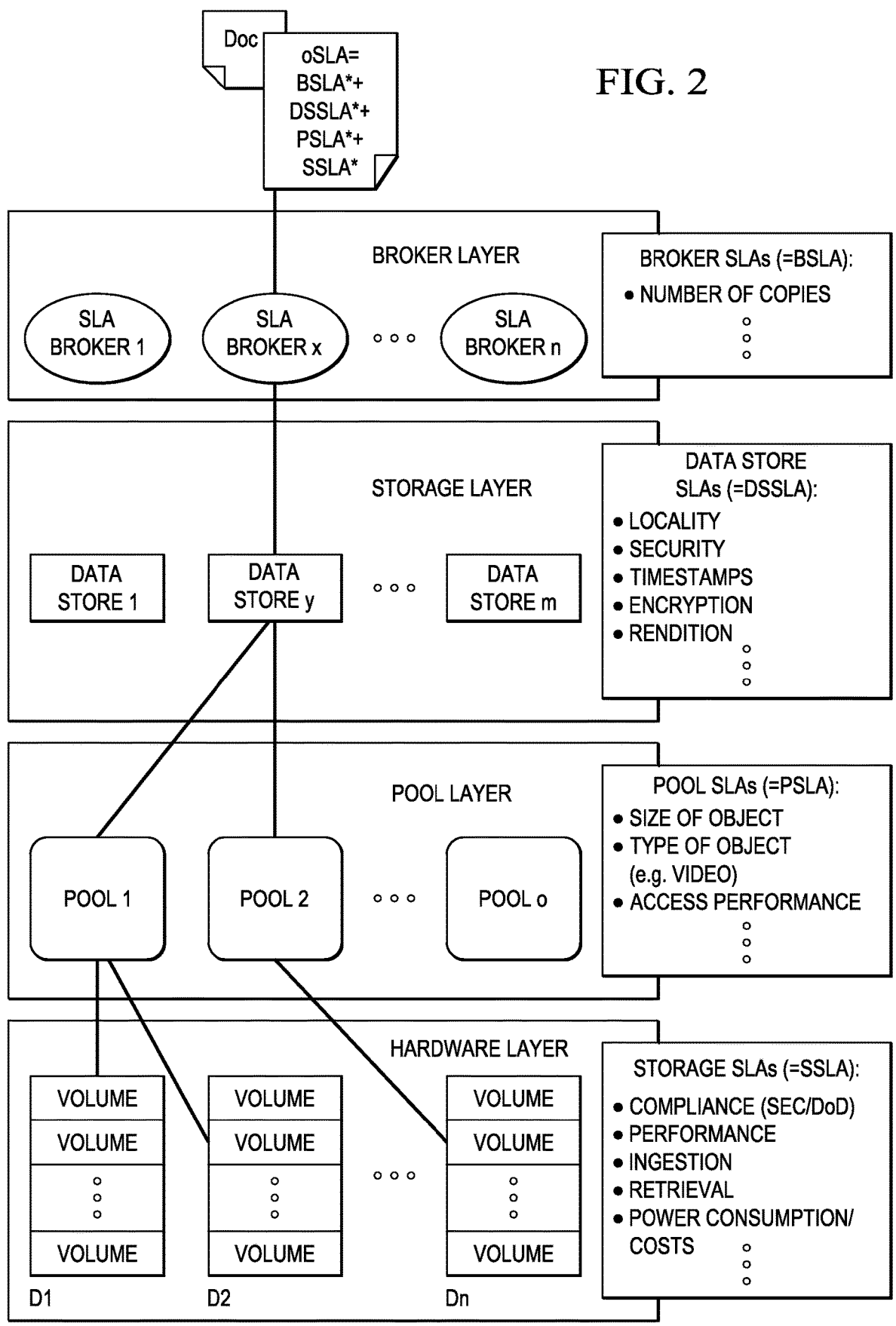
FIG. 2 illustrates multi-layer or multi-tier architecture of the cloud storage system, according to one embodiment of the invention.

FIG. 2 illustrates a multi-layer or multi-tier architecture of the cloud storage system, according to one embodiment of the invention.

The cloud storage system may, for example, correspond to the cloud storage system shown in FIG. 1. As shown in FIG. 2, the cloud processor may be one of a plurality of cloud processors in a cloud processor layer or broker layer. The plurality of cloud processors are designated SLA Broker 1 to n in FIG. 2. Moreover, the plurality of storage components may comprise storage components of a storage layer, storage components of a pool layer, and/or storage components of a hardware layer. The storage components of the storage layer may comprise one or more data stores, designated as Data Store 1 to m in FIG. 2. The storage components of the pool layer may comprise one or more pools, designated Pool 1 to o in FIG. 2. The storage components of the hardware layer may comprise one or more storage devices, designated D1 to Dn in FIG. 2. Each of the storage devices may include a plurality of volumes.

The storage components of the several layers may be linked in a tree-like manner. That is, for example, a SLA Broker of the broker layer, e.g., SLA Broker x, may form the root of a tree, which may be linked to one or more data stores of the storage layer, e.g. Data Store y. Each of these data stores of the storage layer may be linked to one or more pools of the pool layer, e.g., Pools 1 and 2. Finally, each of the pools of the pool layer may be linked to one or more storage devices of the hardware layer, e.g., Pool 1 to storage devices D1 and D2, and Pool 2 to storage device Dn.

Each of the layers has at least one storage property defined using one or more storage component attribute(s). Exemplarily, it is shown in FIG. 2 that the storage component attributes of the broker layer, i.e., of each SLA Broker, define the storage property of the number of copies. The Data Store Service Level Agreements DSSLAs of the storage layer, i.e., of each of the Data Stores 1 to m, define storage properties, namely the location of the data store (Locality), the level of security, timestamps, encryption—yes/no and which, for example—, and the rendition, or the like. Each Pool 1 to o in the pool layer has storage component attributes, designated Pool Service Level Agreements PSLAs, defining, for example, the size of the object, i.e., document, allowed to be stored, the type of the object allowed to be stored, and the access performance, or the like. In the hardware layer, each storage component D1 to Dn, each of which may have a number of volumes, has several storage component attributes, designated Storage Service Level Agreements SSLA, defining, for example, compliance with U.S. Securities and Exchange commission ("SEC") or U.S. Department of Defense ("DoD"), performance, ingestion, retrieval, power consumption, and costs, or the like.

Some or all the above storage component attributes, i.e., BSLAs, DSSLAs, PSLAs, and SSLAs, are provided at the cloud processor. That is, the SLA Brokers in the broker layer are provided with the storage component attributes of each layer. For example, the storage component attributes may be stored or held in a database in the broker layer, accessible by each of the SLA Broker, or in a database of each SLA Broker.

The document to be stored in the cloud storage system is associated with document metadata. The document may refer to any electronic type of media, such as text, image, music, video, or the like. The document metadata define a Service Level Agreement of the document, i.e., a document-based or object-based Service Level Agreement (oSLA). The oSLA defines storage requirements of the document. That is, the requirement with which it is to be complied with when storing or archiving the document in the cloud storage system. For example, it may be required to store two copies of the document in different storages devices to increase the level of redundancy. Accordingly, even if one the copies of the document is lost or become corrupt, e.g., due to a fatal hardware error at the storage device, the document still can be recovered or restored based on the remaining second copy.

According to one example, the storing requirements are defined in accordance with the BSLAs, DSSLAs, PSLAs, and SSLAs of the layers. However, the storage requirements may be defined in any suitable form, e.g., using a natural language: Please store 2—in words two—copies of the document.

Figure 3:
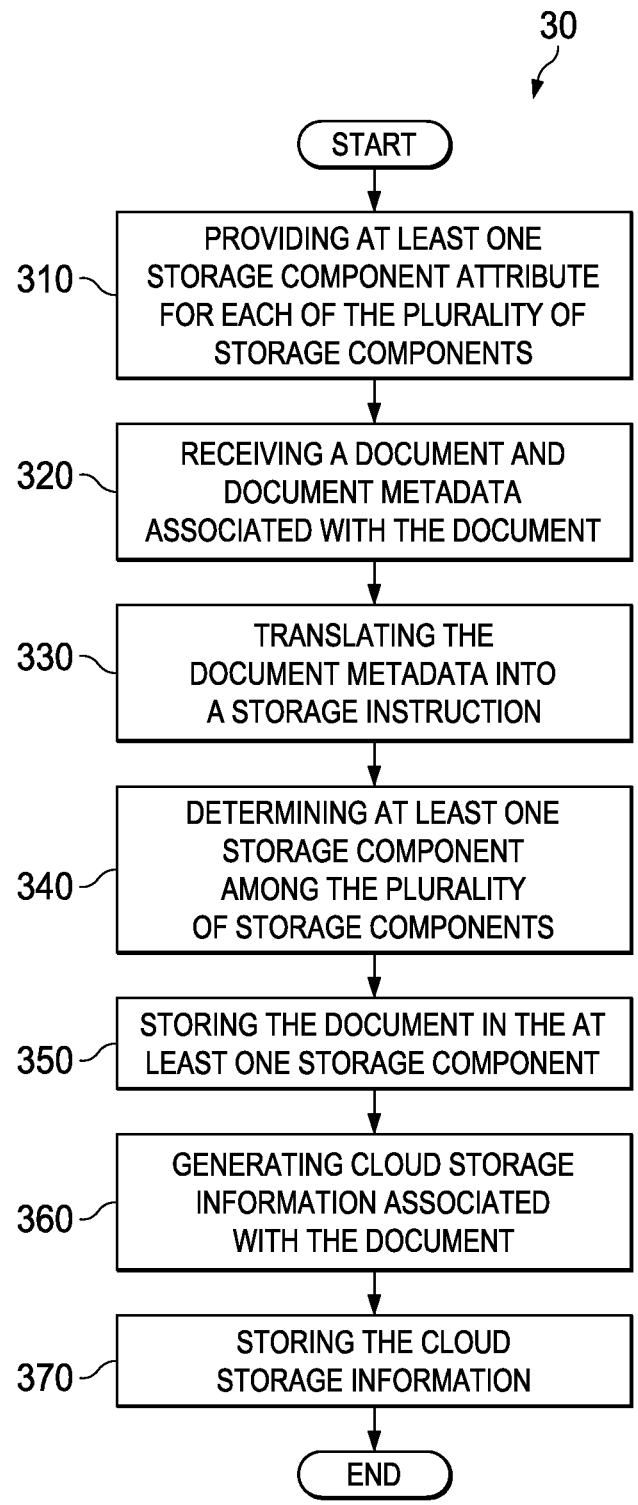
FIG. 3 shows a flow chart/diagram illustrating a method for storing document in a cloud storage system, in accordance with one embodiment of the invention.

FIG. 3 is a flow chart/diagram illustrating a method 300 for storing documents in a cloud storage system according to one exemplary embodiment. The method 300 will now be described in more detail with reference to FIG. 3.

The cloud storage system comprises a cloud processor and a plurality of storage components as, for example, shown in FIG. 1. That is, the functionality of the cloud processor may be provided by the cloud processor 120 shown in FIG. 1 or the broker layer shown in FIG. 2, 4, 6, or 8 or any other data processing component suitable to perform the functionality of the cloud processor as described herein. The functionality of the plurality of storage components may be provided by the storage components 130, shown in FIG. 1 or the hardware layer shown in FIG. 2, 4, 6, or 8 or any other storage or memory suitable to perform the functionality of the plurality of storage components as described herein. According to one embodiment the steps of the method 300 may be performed at the cloud processor 120.

The method 300 starts at block 310. In block 310, at least one storage component attribute is provided for each of the plurality of storage components, as will be described in more detail below with reference to FIG. 6. According to one example the storage component attributes are service level agreements of the storage components and defines a storage property of the storage component. The storage property may define a capability or property of the storage component, i.e., a specific feature of the storage component. For example, the storage property may refer to the performance of the storage component, indicating whether the storage component has high performance as it may, for example, be the case when hard drives are used, or low performance as it may, for example, be the case when tapes drives are used. The storage property may, however, refer to other properties of the storage components such as retention period. The retention period defines a period of time during which a document cannot be deleted (as, for example, required within compliance scenarios such as SEC). In other words, it will be secured, e.g., by the cloud processor or the storage component, that the document is not allowed to be deleted at the storage components during the retention period.

Then, in block 320, a document to be stored and document metadata associated with the document are received. As shown in FIG. 1, the document and the document metadata associated with the document may be sent by a computer 110 of a user and received at the cloud processor 120.

The document may be any type of electronic or machine-readable data such as text, multimedia (e.g., image, video, music, or the like), or other information. For example, the document may be a text document in the Open Document Format or the Portable Document Format.

The document metadata define a storage requirement of the document. The document metadata may be defined using the eXtensible Markup Language ("XML") or any other descriptive language or the like. As the storage requirements, the document metadata may, for example, define that the document is to be stored in compliance with SEC, or such that it can be accessed and/or read with high performance and such that it can be reliably and securely stored/archived for, for instance, five years. However, the document metadata may define other storage requirements. Examples of document metadata will be described in more detail below.

In block 330, the document metadata of the document received in block 320 is translated into a storage instruction. In one example, translating the document metadata may include to translate the document metadata to generate a storage instruction executable by the cloud processor 120.

Using the examples of storage requirements as described above, the SEC storage requirement may be translated into a storage instruction indicating that the document is to be stored/archived at least at two different locations, at a storage component in a particular country and for a retention period of at least ten years. In case the document is to be stored such that it can be accessed and/or read with high performance and such that it can be reliably and securely stored/archived for five years, as described above, translating may include to generate a storage instruction indicating that the document must be stored in a storage component with high performance while the storage component satisfies with a retention period of five years or more.

After translating the document metadata in block 330, at least one storage component among the plurality of storage components is determined based on storage component attributes of the storage component, in block 340. In particular, it is determined whether at least one storage component among the plurality of storage components with a defined storage property matching the storage instruction for the document. That is, at least one storage component is determined at which the document can be stored/archived such that the storage requirement is met.

In one example, each of the storage component attributes of each storage component among the plurality of storage components is compared with the storage instruction and it searched for a match between storage component attributes and the storage instruction. A match may, for example, be found in case of the following relations: equal, part of, smaller or greater than, or the like, depending on the storage component attribute.

Taking into consideration the above described examples, all storage components with high performance among the plurality of storage components, e.g., all hard drives, may be determined to match with a storage instruction according to which the document can be accessed and/or read with high performance therefrom. In contrast, a storage component with low performance among the plurality of storage components, e.g., tape drives, would not be determined because the document stored thereon cannot be accessed and/or read with high performance meeting the defined storage requirements.

In view of the retention period, a storage component among the plurality of storage components may be determined as matching the respective storage requirements if it has a retention period as its storage property which is greater than or equal to the retention period according to the storage requirement of the document to be stored/archived. That is, a storage component having a retention period of ten years matches with a storage requirement defining a retention period for the document of five years. In contrast, a storage component having a retention period of three years or less does not match with the aforementioned storage requirement of five years. On the other hand, a storage component may be configured so as to provide retention protection. This can be done by hardware or software features of the storage component enabling to fix a predetermined retention protection over a certain period of time. Once the retention period is fixed it can later on not be reduced again. Such a storage component would be SEC compliant. The retention period of such a storage component may be set globally for the storage component or separately for each document to be stored therein. Thus, in the above case, a storage component among the plurality of storage components may be determined as matching the respective storage requirements if it provides retention protection at all, and is therefore SEC compliant. The retention period for the document to be archived may be set to be equal to the retention period according to the storage requirement of the document to be stored. That is, the retention period for the document to be stored/archived may be set to be five years, so that the storage components prevents deletion of the document during the retention period set.

In block 350, the document is stored in the at least one storage component determined in block 340. In one example, the method 300 shown in FIG. 3 can optionally further comprise storing the document metadata associated with the document in the at least one storage component determined. The document and the document metadata associated therewith may be stored in the at least one storage component in an associated manner. Preferably, the document and the metadata are stored such that they inextricably linked to each other.

The method 300 shown in FIG. 3 can optionally further comprise a step of generating cloud storage information associated with the document, block 360, stored in the cloud storage system in block 350. In addition, the cloud storage information generated in block 360 may be stored, for example, in a database managed by the cloud processor, in block 370.

For example, the cloud storage information indicate the at least one storage component determined in block 340 at which the document is stored. That is, the cloud storage information indicates the information necessary to access/read the document in/from the storage component. Accordingly, the cloud storage information may, for example, comprise a Uniform Resource Locator ("URL").

The cloud storage information is associated with the document, which means that there is a one-to-one or one-to-many relationship between document and the cloud storage information. To further explain this, there may be one piece of cloud storage information associated with one document, i.e., one-to-one, or one piece of cloud storage information associated with many documents, i.e., one-to-many, which may be the case when copies of the document need to be stored to meet the storage requirements for the document. The cloud storage information may indicate the storage component at which the document is stored, and the storage components at which the copies of the document are stored.

In one example, the cloud storage information may additionally include the document metadata of the document. Both the cloud storage information and the document metadata may be stored, for example, in a database managed by the cloud processor in an associated manner. This improves access/retrieval of the document since it is not necessary to access/read the document metadata from the storage component at which the document is stored, rather the document metadata can be accessed/read without accessing the storage component at which the document is stored.

It will be appreciated that the flow chart/diagram shown in FIG. 3 illustrates only one example of the method according to the invention, namely a method specifically performing step for storing documents in a cloud storage system. However, the method illustrated in FIG. 3 may as well perform the steps shown to archive documents in the cloud storage system.

In the following, retrieval of a document stored in accordance with the method 300 shown in FIG. 3 will be described. Accordingly, the document is stored in at least one storage component among the plurality of storage components in the cloud storage system.

To retrieve a document, a request is received at the cloud processor, for example, from a client. The request indicates the document to be retrieved. The cloud processor may then search for the document. That is, the cloud processor needs to identify the storage component at which the document is stored. In one example, the cloud processor may search for the document in each storage component among the plurality of storage components, or request each of the storage components to indicate whether the document to be retrieved is stored therein or not. In another example, if cloud storage information associated with the document to be retrieved is generated in block 360, the cloud processor may search for cloud storage information being associated with the document to be retrieved. If such cloud storage information are found, the at least one storage component at which the document to be retrieved is stored can be identified, for example, by reading corresponding information such as a URL from the cloud storage information. Then, the storage information is accessed to retrieve the document therefrom and provide the same to the client as response to the request. In case, the document metadata are stored in an associated manner with the document at the storage component, the document metadata is retrieved from the storage component and provided to the client as well.

In the following, an example of the method 300 shown in FIG. 3 further comprises steps of sorting and selecting storage components from the storage components determined in block 340. It will be appreciated by those skilled in the art that the steps of sorting and selecting are performed only in case at least two storage components are determined in block 340.

If so, the storage components are stored based on a level of match between the storage property of each storage component and the storage instruction for the document to be stored with the method 300 shown in FIG. 3. The level of match indicates whether and to which degree the storage property match with the storage instruction.

Taking into consideration the above described examples in which all storage components with high performance among the plurality of storage components, e.g., all hard drives, are determined to match with the storage instruction according to which the document can be accessed and/or read with high performance therefrom, the storage components with high performance may be considered as meeting the storage instruction with the same degree and thus with the same level of match. In this case, additional storage properties such as, for example, costs may be considered. The costs may refer to the charge per cloud storage resource used when the document is stored, or to a storage property of the storage components such as redundancy provided by the storage component.

In view of the example regarding the retention period, a storage component among the plurality of storage components determined providing retention protection may be considered as meeting the storage instruction. The storage instruction defining a retention period of five years then may be used to set the retention period for the document stored/archived at the storage component determined correspondingly, i.e., to be five years.

According to another example, a storage component among the plurality of storage components determined having a retention period of ten years may be considered as meeting the storage instruction with a higher level of match than a storage component having a retention period of five years only, if the storage instruction defines that the document is to be stored with a retention period of five years. Thus, the storage instruction of the document is more than met by the storage component having the retention period of ten years. However, it will be appreciated by those skilled in the art that in this case other storage properties such as, for example, the charge per cloud storage resource may lower the level of match to the disadvantage of the storage component having the retention period of ten years.

From the sorted storage components, the at least one storage components exceeding a predetermined threshold may be selected as the storage components for storing the document. In one example, the predetermined threshold may refer to the storage component having the highest level of match among the plurality of storage components, or may refer to a particular value. The particular value may be set by the client in advance, or the client may be provided with information about the sorting of the storage components and the corresponding levels of match and is then requested to define the predetermined threshold.

In another example, the level of match is based at least partially on costs involved when storing the document in each of the plurality of storage components and/or the predetermined threshold may correspond to the lowest costs involved. That is, taking into consideration all storage requirements and all storage properties costs may be calculated to store the document. The costs may be calculated based on the storage requirements and the storage properties both being weighted.

In the following, the block 310 of the method 300 shown in FIG. 3 will be described in more detail.

According to one example, the cloud processor may request the at least one storage component attribute associated with each of the plurality of storage components. That is, the cloud processor may broadcast the request to storage components. The request may indicate that all storage components attributes are to be provided by the storage components, or that specific storage component attribute such as the retention period is to be provided only.

The storage components receiving the request may, in response there, provide the storage component attributes requested by sending the same to the cloud processor. And, the cloud processor receives the storage component attributes send by each of the storage components.

In addition, the cloud processor may further store the received storage components attributes, for example, in a database managed by the cloud processor and associate the same with the storage component from which the respective storage component attributes have been received.

In the following, an example of the block 330 shown in FIG. 3 will be described. According to this example, translating the document metadata of the document to be stored into the storage instruction may comprise mapping the document metadata to at least one of the storage component attributes of the storage components based on a predefined mapping table.

Using the examples of storage requirements as described above, the predefined mapping table, which may be a database managed by the cloud processor, may define that the SEC storage requirement refers to and is to be mapped to that the document is to be stored at least at two different locations, at a storage component in a particular country and for a retention period of at least ten years. In case the document metadata indicate that the document is to be stored in accordance with SEC, it is search for SEC in the predefined mapping tables and, if SEC is found, the storage instructions is generated so as to indicate that the document is to be archived at least at two different locations, at a storage component in a particular country and for a retention period of at least ten years, thereby translating the document metadata. The storage instruction generated therefore contains information defined in accordance with storage component attributes and thus, the storage instructions contain, according to this example, storage component attributes.

Figure 4:
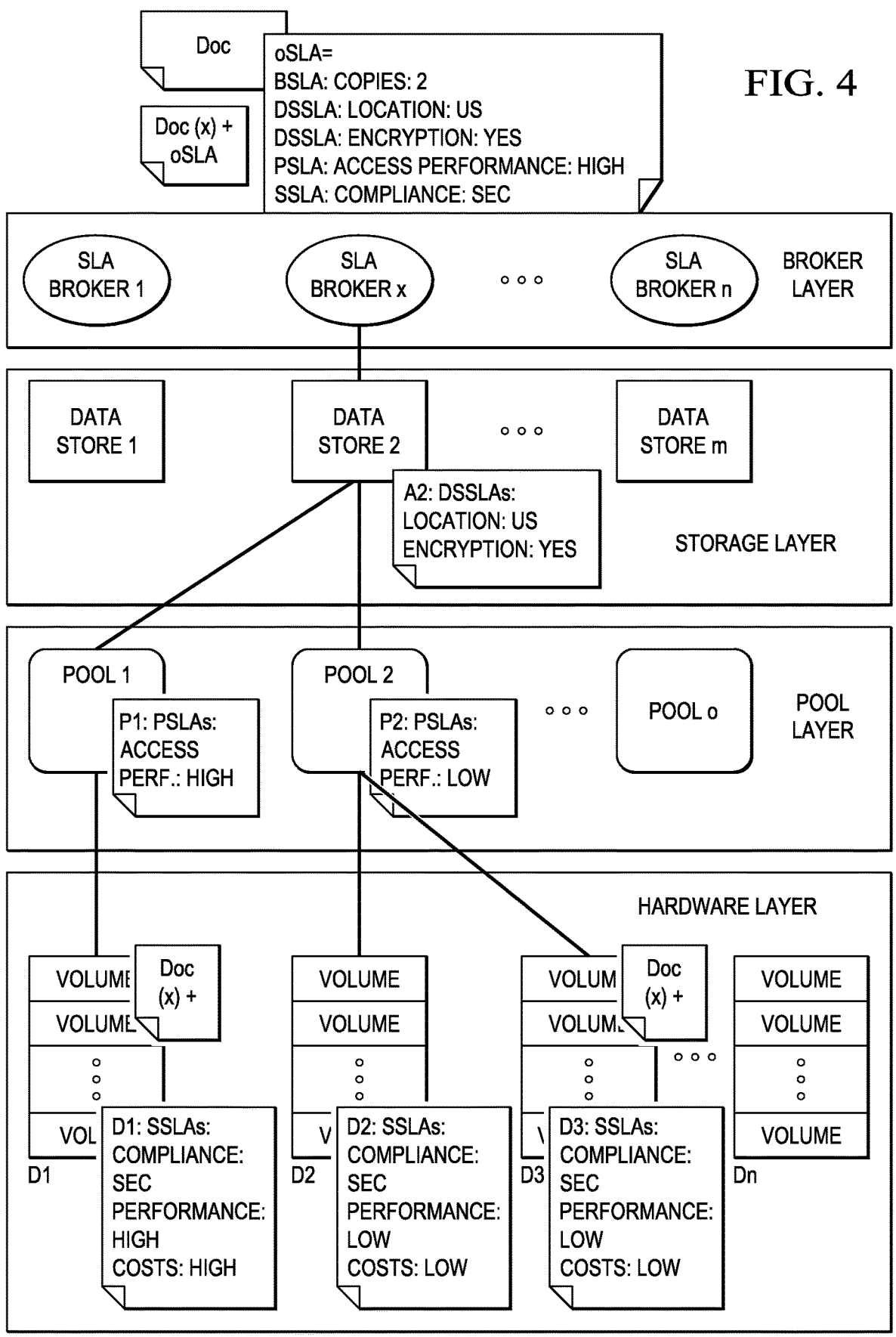
FIG. 4 illustrates the ingestion of a document in the cloud storage system in one specific example of the method for storing document in a cloud storage system according to one embodiment of the invention.

Now referring to FIG. 4 an example of the method 300 shown in FIG. 3 will be described in more detail. FIG. 4 illustrates the ingestion of a document in the cloud storage system, shown in FIG. 2.

Exemplarily, it is shown in FIG. 4 that the storage component attributes of Data Store 2 (DSSLAs) define storage properties of Data Store 2, namely its location in the U.S. and the property to store documents encrypted. Each Pool 1 and 2 has a storage component attribute (PSLAs) defining the access performance as storage property. As shown, Pool 1 provides high access performance, while Pool 2 provides low performance. Each storage component D1 to Dn has several storage component attributes (SSLA) defining compliance, performance, and costs. For example, storage component D1 has the following storage properties, defined by the storage component attributes: compliance with SEC, high performance, and high costs. All these storage component attributes, i.e., DSSLAs, PSLAs, and SSLAs, are provided at the cloud processor, in accordance with block 310 of FIG. 3.

Now, in case a client provides a document and document metadata to a SLA broker. That is, the SLA Broker x of FIG. 4 and thus the cloud processor receives a document and document metadata associated with the document, similar to block 320 shown in FIG. 3. The document metadata are designated object-based Service Level Agreements oSLA in FIG. 4. For example, the oSLA define the following storage requirements of the document: two copies to be stored by the broker layer (BSLA), location of the data store in the storage layer within the U.S. and the data store needs to provide encryption (DSSLAs), high access performance in the pool layer (PSLA), and SEC compliance in the storage layer (SSLA).

The SLA Broker x now analyzes and translates the aforementioned oSLA of the document into a storage instruction, similar to block 330 of FIG. 3.

Then the SLA Broker x searches for a storage component in the storage layer of which the storage properties match with the storage instruction for the document. In the example shown in FIG. 4, it is searched for a data store among Data Stores 1 to m in the storage layer of which the storage properties defined by the DSSLAs match with the storage instruction for the document, it then is searched, in the data stores having a match, for a pool among Pools 1 to o in the pool layer of which the storage properties defined by the PSLAs match with the storage instruction for the document, and it then finally is searched, in the pools having a match, for a storage device among D1 to Dn in the hardware layer of which the storage properties defined by the SSLAs match with the storage instruction for the document. Accordingly, it is determined that Data Store 2 has DSSLAs matching with the DSSLAs in the oSLA associated with the document, that Pool 1 has PSLAs matching with the PSLAs in the oSLA associated with the document, and that D1 has SSLAs matching with the SSLAs in the oSLA associated with the document. The document therefore is stored in D1, similar to block 350 of FIG. 3. In addition, since the oSLA associated with the document defines a storage requirement of two copies a further storage component needs to be determined.

As it is a storage requirement to store a copy of the document, it may be the case that no other pool among Pools 1 to o having PSLAs matching with the oSLAs can be determined. In this case, a pool may be selected to store the copy of the document of which the PSLAs does not completely match with the oSLAs since it may be sufficient to store the copy of the document in a pool having PSLAs defining low access performance but in a storage device having SSLAs defining low costs. In the example shown in FIG. 4, D3 may be determined and the copy of the document may be stored therein. The document is stored on a volume of D1 and the copy on a volume of D3.

Figure 5:
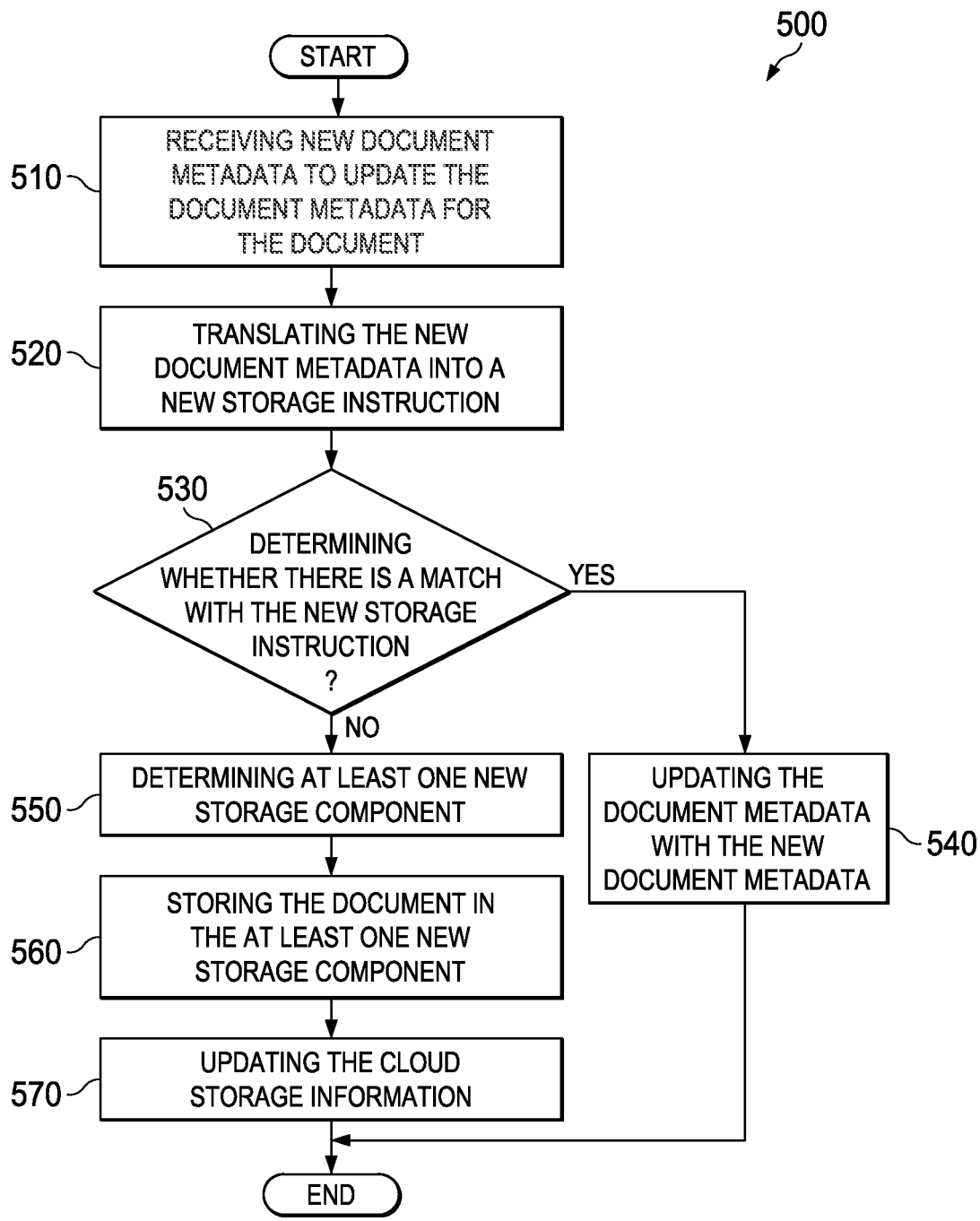
FIG. 5 shows a flow chart/diagram illustrating a method for updating a document already stored and/or document metadata associated with the document already stored, in accordance with one embodiment of the invention.

FIG. 5 shows a flow chart/diagram illustrating a method for updating a document already stored and/or document metadata associated with the document already stored, in accordance with one embodiment of the invention.

The method for updating a document already stored, for example, in accordance with the method 300 shown in FIG. 3, will now be described.

The document already stored may be retrieved from the cloud storage system as described above, namely by request of the client. The client may change the retrieved document or the content of the retrieved document. After change, the client may intend to store the changes made. The document with the changes is submitted to the cloud processor with a request to update the document already stored. Then, the cloud processor may search for the storage component at which the document is already stored, e.g., based on cloud storage information, as described above. The document with the changes is then stored at the storage component such that the document already stored is overwritten.

According to one example, the document already stored may be marked as old version but not replaced with the document with the changes, while the document with the changes is stored in the storage component. In this case, it will be appreciated by those skilled in the art that information regarding the marked as old version document is to be keep, i.e., stored in the cloud storage information of the document.

In addition, the cloud storage information may be updated with respect to its time stamp or the time stamp of the document with the changes.

In case the cloud storage information of the document already stored indicates that at least one copy of the document has been stored, the document with the changes needs to be stored as described above and copies of the document with the changes need to be stored over the copies of the document already stored such that these copies are overwritten.

Now, the method for updating document metadata associated with a document already stored will be described with reference to FIG. 5. The method 500 starts in block 510.

In block 510, new or updated document metadata may be received at the cloud processor. The client may have generated new document metadata for a document already stored, or may retrieve originally received document metadata for a document from the cloud storage system and may update the originally received document metadata. For example, the client may have updated the number of copies of the document already stored or its retention period. After generation or change, the client sends the new or updated document metadata to the cloud processor, with a request to update the same. The client may further indicate in the request the document already stored with which the new or updated document metadata are to be associated.

Then, in block 520, the new or updated document metadata are translated into a new storage instruction, similar to block 330. Further explanation of block 520 is omitted, but reference is made to the description of block 330.

After translating, the cloud processor determines, based on the storage attributes, whether the storage property of the at least one storage component at which the document is already stored have a match with the new storage instruction, in block 530. For example, the cloud processor may perform the step of determining according to block 340 shown in FIG. 3 with respect to the new storage instruction, and determine whether the storage component at which the document is already stored is one of the at least one newly determined storage components. In case the storage component is determined to be included, there is a match. In another example, the cloud processor may determine based on storage component attributes of the storage component at which the document is stored whether the storage property of which matches with the new storage instruction.

In case of a match, the originally received document metadata for the document are updated with the new or updated document metadata, in block 540. As the document is already archived in the storage component determined, it is not necessary to update or store the same.

Otherwise, the cloud processor may perform a step of determining, in block 550, similar to the step of determining according to block 340 shown in FIG. 3, and optionally, the steps of sorting and selecting described above, with respect to the new storage instruction to determine at least one storage component among the plurality of storage components with a defined storage property matching the new storage instruction. The document and the document metadata are then stored, in an associated manner, in the newly determined storage component, in block 560.

If there are copies of the document already stored, the document metadata of each of the copies are updated with the new document metadata. In the latter case, copies of the document, as required according to the storage requirements, may be stored in newly determined storage components.

In block 570, a step of updating the cloud storage information associated with the document to indicate the at least one new storage component at which the document now is stored may be performed by the cloud processor additionally. The cloud storage information corresponding to the document associated with the new or updated document metadata may be retrieved, e.g., from a database managed by the cloud processor. The cloud storage information then is updated by the cloud processor to indicate the new storage component, for example, by using a URL to the new storage component.

In one example, block 570 may further comprise the following. After having determined the new storage component, the cloud processor may search for the cloud storage information associated with the document of which the document metadata have been changed. From the cloud storage information, the cloud processor may obtain the storage component at which the document presently is archived. The document may then be move from the storage component at which the document presently is stored to the new storage component. To keep the cloud storage information up-to-date, the cloud processor may update the cloud storage information to indicate the new storage component at which the document now is stored.

Figure 6:
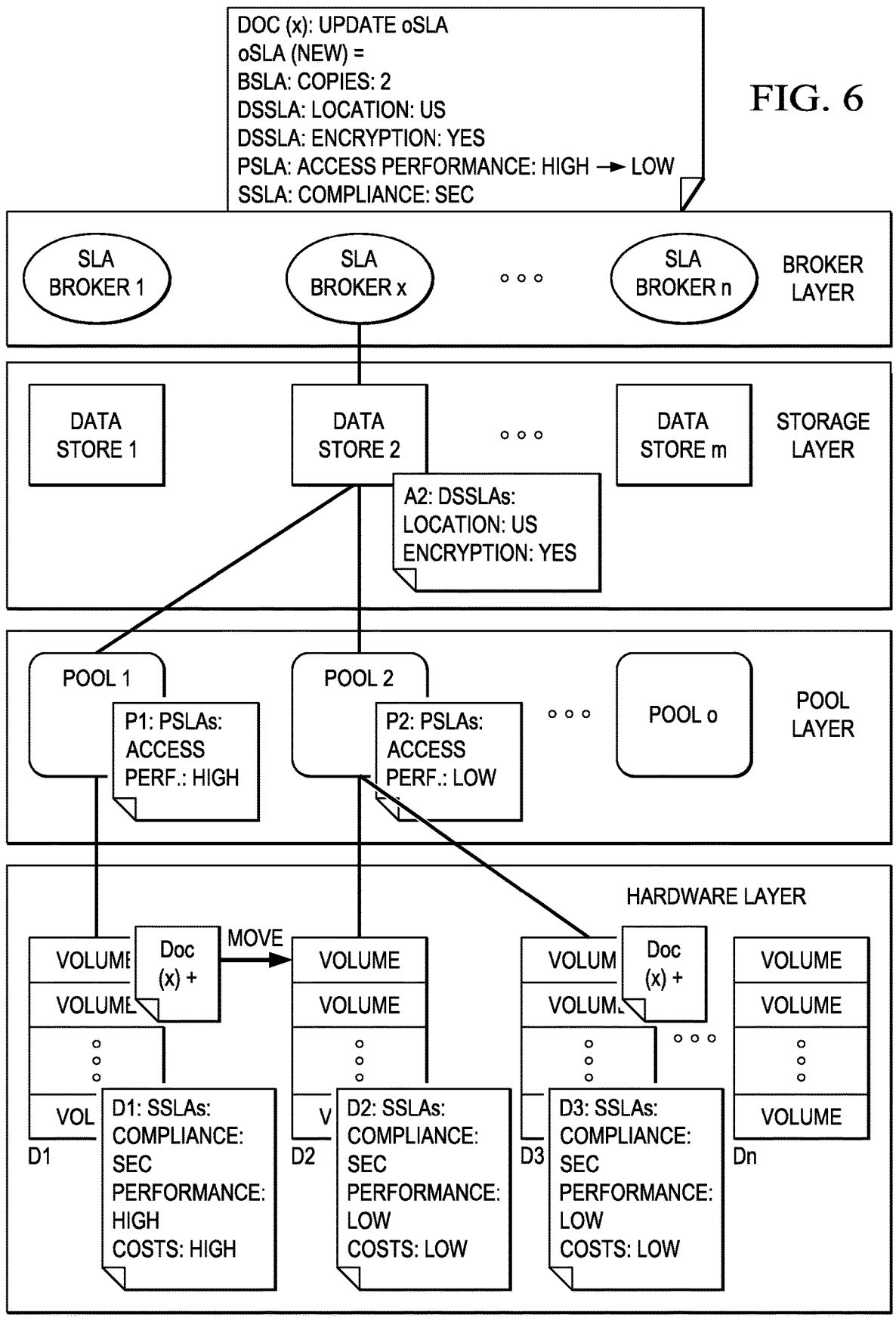
FIG. 6 illustrates the update of a document in the cloud storage system in specific examples of the method for storing document in the cloud storage system according to one embodiment of the invention.

FIG. 6 illustrates the update of a document in the cloud storage system in specific examples of the method for storing documents in the cloud storage system according to one embodiment of the invention.

In the following, it will be described how to update the document metadata of the document stored as described with reference to FIG. 4. In particular, it will be described which steps are to be performed, e.g., by the cloud processor, or the SLA Broker x in the example of FIG. 4, if the document metadata of the document already stored are changed.

As described with reference to FIG. 4, the document has been stored in storage devices D1 and D3 to comply with the storage requirements defined in the oSLA. Now, the client has changed the oSLA. That is, the client has changed the storage requirements of the document. For example, the client may have decided that it is not necessary any further that the document can be accessed with high performance. Accordingly, the client changed the access performance from high to low. The client then sends the changed document metadata, i.e., the oSLA, to the cloud processor which has been selected to store the document, i.e., SLA Broker x.

After receiving the changed document metadata, the SLA Broker x translates the same into a new storage instruction. This may be performed in accordance with block 330 shown in FIG. 3. In this example, the access performance which has been changed from high to low is a storage component attribute of the pool layer, such that a new storage instruction is formed revealing that the pool in the pool layer has an access performance being low.

The SLA Broker x then determines based on the storage component attributes whether the storage property of the storage devices D1 and D3 at which the document is stored match with the new storage instruction. In the example of FIG. 6, it will be determined by the SLA Broker x that storage device D1 is a storage component of Pool 1, and that Pool 1 provides high access performance. Irrespective of whether high access performance usually is much better than low access performance, the costs involved therewith may be undesirably increased. In this case, the SLA Broker x decides to search for and thus determines a storage component having storage properties which match with the new storage instruction of the document. The SLA Broker x determines the storage component in accordance with block 340 shown in FIG. 3. In the present example, the SLA Broker x determines storage device D2 since it is a storage component of Pool 2 which provides low access performance. It is considered that the storage properties of storage device D2, i.e., including the storage properties of storage components of the archive and pool layers to which the storage device D2 is linked, match with the new storage instruction as well.

After determining the SLA Broker x moves the document together with the document metadata from the storage device D1 to storage device D2. In particular, the SLA Broker x reads both the document and the document metadata from the storage device D1, and writes the document and the updated document metadata to the storage device D2. Finally, the SLA Broker x may delete the document and the document metadata from the storage device D1 to free space.

The document now is stored in accordance with the updated storage requirements. This may be indicated to the client.

Figure 7:
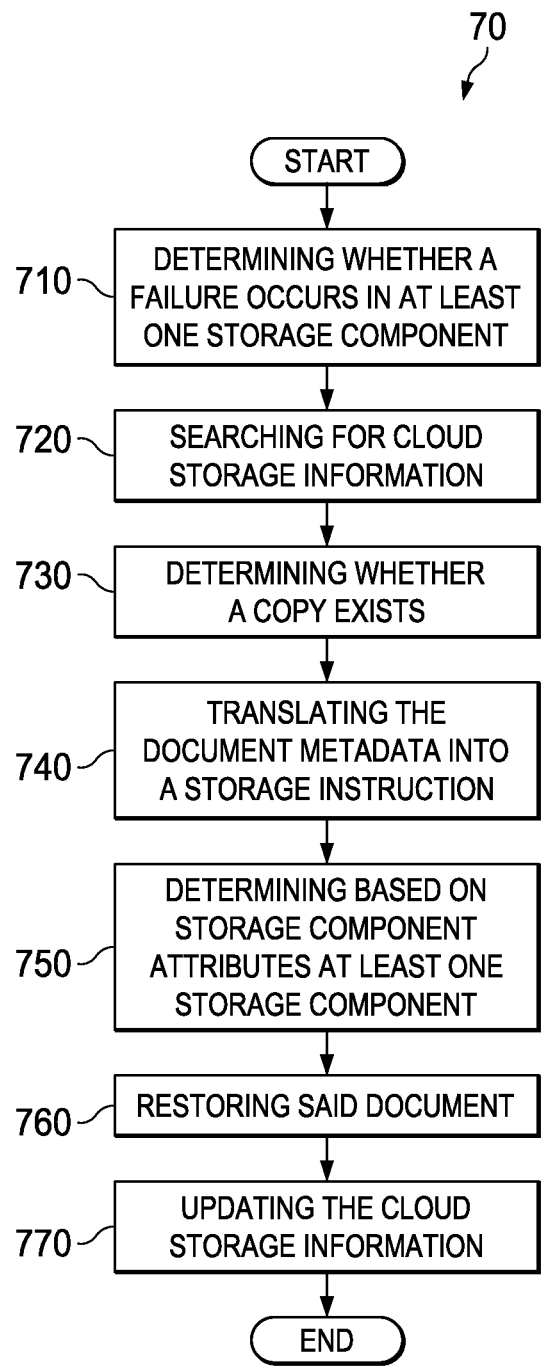
FIG. 7 shows a flow chart/diagram illustrating a method for restoring a document after failure, in accordance with one embodiment of the invention.

FIG. 7 shows a flow chart/diagram illustrating a method for restoring a document after failure, in accordance with one embodiment of the invention.

Starting with block 710, the cloud processor may monitor the each of the plurality of storage container to determine whether a failure occurred in one of them. The failure may refer to a communication failure to or with the storage device, or a failure of the storage component itself. For example, a failure may be determined if the storage component is gone offline due to a loss of power, or if a storage device such as a hard drive of the storage component has errors when reading or writing data.

In case of the determination that a failure occurred, the cloud processor may search for cloud storage information indicating documents stored in the storage component at which the failure occurred, in block 720. Using the cloud storage information of each of the documents, the cloud processor may then determine whether a copy of the document exists, in block 730, and retrieve the document metadata associated with the copy from the storage component at which the copy is stored, by using the indicating in the cloud storage information, e.g., the URL.

Then, the cloud processor performs the steps of translating the document metadata of the copy into a storage instruction to restore the document, in block 740, and determining based on storage component attributes at least one storage component with a defined storage property matching the storage instruction to restore the document, in block 750. Blocks 740 and 750 are similar to blocks 330 and 340, respectively, shown in FIG. 3, so that further explanation can be omitted.

In order to restore the document, block 760, the cloud processor may read the copy of the document to be restored from one of the storage components indicated by the cloud storage information, and store the copy as the document restored at the storage component determined in block 750.

In one example, the cloud processor may further update the cloud storage information associated the document to indicate the storage component at which the copy has been stored, block 770.

Figure 8:
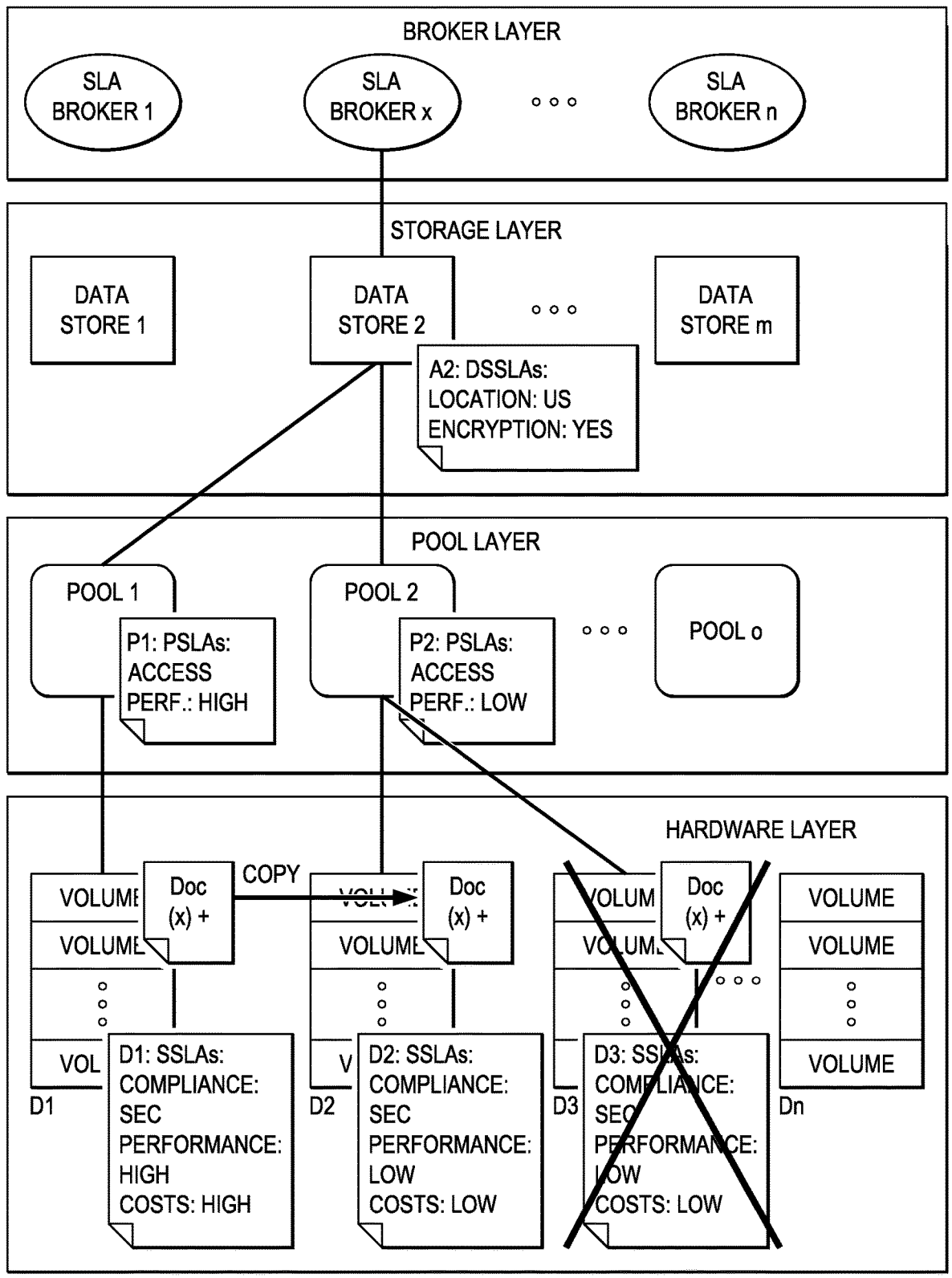
FIG. 8 illustrates the restore of a document after failure according to one embodiment of the invention.

FIG. 8 illustrates the restore of a document after failure according to one embodiment of the invention.

In the following, it will be described how to restore a document stored as described with reference to FIG. 4. In particular, it will be described which steps are to be performed, e.g., by the cloud processor, or the SLA Broker x in the example of FIG. 4, to restore a document if a failure occurs in the storage component at which the document is stored. It will be appreciated by those skilled in the art that restoring of the document only is possible if a copy is present at a storage component not having an error.

As described with reference to FIG. 4, the document has been stored in storage devices D1 and D3 to comply with the storage requirements defined in the oSLA. Now, a failure occurs at storage device D3, such that all documents stored therein become lost or at least corrupt. That is, the copy of the document stored in storage device D1 becomes lost. That is, since the storage requirements of the document define that the document is to be stored in two copies, these storage requirements are not fulfilled any further, which will be recognized by the SLA Broker x. The storage device or any other unit monitoring the storage device may notify the failure to the SLA Broker. Otherwise, the SLA Broker may monitor the storage device and detect that a failure occurred in the storage device.

In the present example, the SLA Broker x determines that a failure occurs in the storage device D3. To restore the documents stored in the storage device D3, the SLA Broker x may determine all documents stored in the storage device D3, e.g., by searching for cloud storage information indicating that a document is stored in the storage device D3, and based on the cloud storage information determines whether a copy of the document exists. If so, the SLA Broker x retrieves the document metadata associated with the copy of the document, and translates the same into a storage instruction similar to block 330 shown in FIG. 3.

The SLA Broker x then determines based on storage component attributes a storage component of which the storage property matches with the storage instruction, similar to block 340 shown in FIG. 3.

Finally to restore that the document is stored in accordance with the storage requirements, the SLA broker x copies the copy of the document and the document metadata both read from storage device D1 indicated by the cloud storage information to storage device D3. After copying the SLA Broker may update the cloud storage information to indicate that copies of the document have been stored in storage devices D1 and D2.

Other examples of the invention provide a cloud storage system, a cloud processor, a system for storing documents, and a non-transitory computer readable medium.

The cloud storage system 100, such as shown in FIG. 1, comprises a cloud processor 120 and a plurality of storage components 130. The cloud processor 120 performs functions to or has means adapted to perform steps of a method as described with reference to FIG. 3 above.

The system for storing documents in the cloud storage system 100 as shown, for example, in FIG. 1 may comprise a cloud processor 120 and a plurality of storage components 130. The cloud processor 120 performs functions to or has means adapted to perform steps of a method as described with reference to FIG. 3 above.

Moreover, a non-transitory computer readable medium is provided. The non-transitory computer readable medium may comprise instructions to be executed by on a computer to configure the computer to perform functions of the cloud processor, as described in connection with the method 300 shown in FIG. 3.

However, a detail explanation of the cloud storage system or the functions performed by the cloud processor or the instructions comprised on the non-transitory computer readable medium are omitted as they are disclosed in detail above, for example, with reference to FIGS. 3 to 8.

As described above, the invention solves problems associated with storing content in the cloud, e.g., in the cloud storage system 100 shown in FIG. 1, but wherein the user or owner of the content or the cloud service provider would like to or for example is required according to respective applicable jurisdiction to maintain control of the content in the cloud or is able to ensure that storage of the content in the cloud fulfills certain requirements. For example, in some jurisdictions, there is a requirement that content must be stored in a specific location (e.g., in a particular country). So the content is in the cloud, but stored at a storage server, or storage component, which is located in a specific location (e.g., the United States of America, U.S.A, or Germany). Even if the content can be stored in the cloud, the content must be stored in a specific country (e.g., the storage server has to be located in the specific country). The invention can ensure that the content stored in the cloud is stored in the specific country irrespectively of any modification within the cloud and over the lifetime of the content in the cloud.

To achieve that the content is stored in the specific country, the invention provides at least one storage component, e.g., the storage component 130 shown in FIG. 1, being located in a specific country, which is one of a plurality of storage properties of the storage component. In one example, the at least one storage component may be located in the U.S.A. That is, the storage property of the storage component indicates that the location is in the U.S.A., and the invention provides a storage component attribute defining that storage property. That is, the storage component attributes defines the storage component being located in the U.S.A. Now, in case the customer has content to be stored under the U.S. jurisdiction, the customer provides metadata for the content to be stored, e.g., as an oSLA, defining that the content necessarily is to be stored in the U.S.A., i.e., under U.S. jurisdiction, and associates the same with the content to be stored. The content together with the metadata then is provided, e.g., by using a computer such as the client computer 110 shown in FIG. 1, to the cloud, e.g., the cloud processor 120 shown in FIG. 1. After receiving the same at the cloud processor, the metadata is translated into a storage instruction. For example, the storage instruction may indicate that the content is to be stored on a storage component located in the U.S.A., e.g., a storage component having a corresponding SSLA. Among a plurality of storage components, each having a storage property indicating a location, at least one storage components is determined of which its storage property matches with the storage instruction. That is, a match may be determined in case the location indicated by the storage property and the location indicated in the metadata correspond to each other, are equal or match. The content then is stored in the storage component determined and thus in accordance with the storing requirements for the content. So, it can be ensured that the content is stored at a location within the U.S.A.

In another example, the control of the content is based on "time"—not only does content in the cloud potentially have to be stored in a specific country, but needs to be stored in that location for a particular period of time (e.g., pursuant to retention policies). That is, metadata associated with the content to be stored is provided defining a period of time, i.e., a retention period, during which it is ensured that the content cannot be deleted. In one example, the period of time may indicate five years, which means that the content is to be protected from deletion during this period of time. Based on a storage instruction into which the metadata is translated, a storage component is determined which provides retention protection. The content then is stored, in accordance with the storage instruction, at the storage component determined while setting the period of time for retention protection, i.e., the retention period, at the storage component so as to correspond to the period of time defined in the metadata, i.e., five years. So, it can be ensured that the content is stored such that deletion of the content is prohibited during the period of time.

In one particular example, the system of the invention may be connected to an optical character recognition (OCR) system. Such a system may, for example, be used for travel receipt management. In such a system, it may be required that content, e.g., travel receipts, are to be stored at storage components being located in a specific country. For example, in a multi-national enterprise having branches in several countries all over the world, travel expense reports may be made by each of the branches separately. That is, the employees of one of the branches, e.g., the U.S. branch, traveling around the world report the travel expenses and forward travel receipts to their own branch only. To achieve this, the travel receipts are scanned and processed by using the OCR system. For each of these travel receipts or groups of travel receipts, a storage requirement for storing the travel receipts in a specific country may be defined, by the employee or the branch. This can be achieved by defining metadata and associating the metadata with travel receipts. The travel receipts scanned and processed by using the OCR system then are provided together with the metadata to the cloud. Based thereon, the cloud, e.g., the cloud processor 120 shown in FIG. 1 generates a storage instruction by translating the metadata, the storage instruction defining that the travel receipts are to be stored in a specific country, namely the country of the branch. The cloud processor then determines storage components being located in the country indicated in the storage instruction, and stores the travel receipts in the storage components determined. For example, the travel receipts can be stored on a smart phone running an OCR application as part of the OCR system and the OCR processed travel receipt can then be stored in the cloud storage system according to the invention, wherein the so processed the travel receipt is then stored on a storage component being located in the specific country of the employee's branch so as to comply with the respective legal and tax requirements, etc.

In yet another example, the cloud storage system according to the invention may be connected, via a communication network such as a LAN or the Internet, to a content server. The content server may store content, e.g., in a plurality of documents. The cloud storage system may form an archive/storage system for the content server, e.g. in form of an archive/storage server in the cloud being accessible from the content server. The content stored at the content server may thus be stored and/or archived in the cloud storage system in accordance with the method described above with reference to FIG. 2. That is, document metadata is generated and associated with each document representing the content. For example, the document metadata may indicate that the content is to be stored in accordance with a retention period of five years, as storage requirement. Accordingly, the content cannot be deleted from the cloud during this retention period. Now, it may be requested, for several reasons, to change the retention period for the content archived/stored from, e.g., five years to seven years. The content server may provide corresponding means for changing the document metadata for one or more documents. A user of the content system, having permission to change the retention period, may call the means and change the retention period. Actually, the user changes the storage requirements and thus the document metadata. It is to be noted that the retention period preferably can be increased only. The content server then may, either on request by the user or automatically, send the document metadata indicating the changed retention period to the cloud, i.e., to the cloud processor 120 shown in FIG. 1. The cloud processor receives the document metadata, similar to block 510 shown in FIG. 5, and translates the same into a new storage instruction, similar to block 520 shown in FIG. 5. After translating, the cloud processor may determine, based on the storage attributes of the storage components to which the cloud processor is connected, whether the storage property of the at least one storage component at which the document already archived/stored is stored have a match with the new storage instruction, similar to block 530 shown in FIG. 5. In case of a match, the document metadata for the document is updated with the document metadata indicating the changed retention period, similar to block 540 shown in FIG. 5. That is, the retention period is updated so as to indicate seven years instead of five years as before. Otherwise, the cloud processor may perform steps, similar to blocks 550 and 560 shown in FIG. 5. After performing the aforementioned steps, the content is archived/stored in the cloud, i.e., at a storage component, and is prevented from being deleted during a retention period of seven years. Accordingly, the retention policy of the archive/storage server is driven by the storage requirements defined or input at the content server. The storage requirements, e.g., the retention period in the content server extending from five years to seven years as in the above example, promulgates to the archive/storage server automatically. This achieves deeper automatic integration and modification of document metadata such as retention period from the content server through all layers of storage to the actual storage component in the cloud.

In a further example, the invention allows to achieve flexible connection between the storage components, for example, storage components corresponding to customer's on-site premise and storage components of the cloud storage system. The invention allows to migrate document from one storage component to another storage component, e.g., at a different location, without affecting the document metadata associated with the documents to be migrated. The migration of documents already archived/stored in the cloud storage system may be performed similar to the method discussed above with reference to FIG. 5. The documents already archived/stored together with document metadata in the cloud storage system may be archived/stored in accordance with the method described above with reference to FIG. 2. To migrate documents from one storage component to another storage component, the storage requirements of these documents need to be changed. For example, one particular document may be migrated from a storage component located in the cloud storage system, e.g., within the U.S.A., to an on-site premise storage component of the customer, i.e., a storage component being located in the server farm of the customer. The storage component located in the cloud storage system may define a storage component attribute indicating the location of the storage component as being in the cloud, or more specifically as being in the cloud anywhere in the U.S.A., whereas the on-site premise storage component defines a storage component attribute indicating the location of the storage component as being local to the customer. The document may be archived/stored in accordance with a storage requirement defined in the document metadata, indicating to archive/store the documents on storage components within the U.S.A. In accordance with the method shown in FIG. 2, the documents have been archived/stored at such a storage component in the cloud as described above. Now, the customer may wish to migrate these documents to an on-site premise storage component. The document metadata of the document need to be changed by the customer so as to indicate that the document are to be archived/stored at the on-site premise storage component. This updated document metadata are then sent to the cloud processor, e.g., the cloud processor 120 shown in FIG. 1, which receives the same, similar to block 510 shown in FIG. 5. The cloud processor then translates the updated document metadata to new storage instructions, similar to block 520 shown in FIG. 5, and determines, based on the storage attributes, whether the storage property of the storage component at which the documents are already archive/stored have a match with the new storage instructions, similar to block 530 shown in FIG. 5. However, since the documents have been stored in a storage component located in the U.S.A. and not an on-site premise storage component, the cloud processor does not determine a match. The cloud processor therefore determines, similar to block 550 shown in FIG. 5, a storage component among the plurality of storage components of which the storage property match with the new storage instruction. In this example, the cloud processor determines the on-site premise storage component having a match. The document and the document metadata are then stored, in an associated manner, in the storage component newly determined, in block 560. Finally, the cloud processor moves the documents from the storage component located within the U.S.A. to the on-site premise storage component. The documents moved are associated with the updated document metadata. Thus, the invention relates to the functionality that allows the migration in cloud-based environment.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component. The scope of the present disclosure should be determined by the following claims and their legal equivalents.

What is claimed is:

1. A method for storing documents in a cloud storage system comprising a cloud processor and a plurality of storage components, the method comprising:

providing, by the cloud processor of the cloud storage system, at least one storage component attribute for each of the plurality of storage components, the cloud processor representing a root of a tree, wherein the tree links the cloud processor and the plurality of storage components in the cloud storage system, the plurality of storage components comprising a hardware layer of storage devices, the hardware layer having a storage property defined using a storage component attribute of the at least one storage component attribute provided by the cloud processor of the cloud storage system;

receiving, by the cloud processor from a user computer, a first document and document metadata thereof, the document metadata defining a storage requirement of the first document, the storage requirement of the first document including a retention period;

responsive to receiving the first document from the user computer, generating, by the cloud processor of the cloud storage system, a storage instruction for the first document based on the document metadata of the first document, the storage instruction executable by the cloud processor of the cloud storage system;

determining, by the cloud processor of the cloud storage system, at least one storage component from the plurality of storage components linked to the cloud processor in the tree that has a defined storage property or capability that matches the storage instruction generated by the cloud processor for the first document, the determining comprising comparing a retention period of the at least one storage component and the retention period of the first document that is defined by the document metadata;

storing the first document in the at least one storage component determined by the cloud processor according to the storage instruction generated by the cloud processor for the first document;

receiving, by the cloud processor from a content server automatically or responsive to a request by a user, new document metadata for the first document, the new document metadata for the first document updates the originally received document metadata for the first document;

responsive to receiving the new document metadata for the first document from the content server, generating, by the cloud processor of the cloud storage system, a new storage instruction for the first document based on the new document metadata for the first document, the new storage instruction executable by the cloud processor of the cloud storage system;

determining, by the cloud processor based on the storage component attributes, whether the storage property or capability of the at least one storage component at which the first document is stored matches with the new storage instruction thus generated by the cloud processor for the first document; and responsive to a match between the storage property or capability of the at least one storage component and the new storage instruction thus generated by the cloud processor for the first document, updating the originally received document metadata for the first document with the new document metadata for the first document without moving the first document, otherwise:

determining, based on storage component attributes, at least one new storage component among the plurality of storage components linked to the cloud processor in the tree that has a defined storage property or capability that matches the new storage instruction thus generated by the cloud processor for the first document; and storing the first document in the at least one new storage component determined by the cloud processor as matching the new storage instruction thus generated by the cloud processor for the first document.

2. The method according to claim 1, further comprising:
at the cloud processor, generating cloud storage information associated with the first document stored in the cloud storage system indicating the at least one storage component at which the first document is stored.

3. The method according to claim 2, wherein the cloud storage information associated with the first document includes a Uniform Resource Locator of the first document.

4. The method according to claim 1, further comprising:
storing the document metadata associated with the first document in the at least one determined storage component.

5. The method according to claim 1, further comprising:
at the cloud processor:

receiving a request indicating a document to be retrieved from the cloud storage system;

searching for cloud storage information associated with the document to be retrieved to identify the at least one storage component at which the document to be retrieved is stored; and retrieving the document from the at least one identified storage component.

6. The method according to claim 1, wherein the providing at least one storage component attribute for each of the plurality of storage components further comprises:
at the cloud processor:

requesting the at least one storage component attribute associated with each of the plurality of storage components; and in response, receiving the at least one storage component attribute provided by the respective storage component.

7. The method according to claim 6, wherein the providing at least one storage component attribute for each of the plurality of storage components further comprises:
at the cloud processor:

storing the at least one storage component attribute received from the respective storage component; and associating the at least one storage component attribute with the respective storage component.

8. The method according to claim 1, wherein the determining further comprises:

sorting the storage components based on a level of match between the storage property or capability of each storage component and the storage instruction for the first document; and selecting, based on the level of match exceeding a predetermined threshold, the at least one storage component.

9. The method according to claim 1, further comprising:
at the cloud processor, updating cloud storage information associated with the first document to indicate the at least one new storage component at which the first document is stored.

10. The method according to claim 1, wherein storing the first document in the at least one new storage component further comprises:

searching for cloud storage information associated with the first document;

moving the first document from the at least one storage component indicated by the cloud storage information to the at least one new storage component determined; and updating the cloud storage information associated with the first document to indicate the at least one new storage component at which the first document is stored.

11. The method according to claim 1, wherein the generating the storage instruction for the first document comprises:

mapping the document metadata to at least one of the storage component attributes of the storage components based on a predefined mapping table, wherein the storage instruction contains the at least one storage component attribute.

12. The method according to claim 1, further comprising:
at the cloud processor:

determining whether a failure occurs in at least one storage component among the plurality of storage components;

searching for cloud storage information indicating a document stored in the at least one storage component at which the failure occurs;

based on the searching for cloud storage information, determining whether a copy of the document exists, and retrieving document metadata associated with the copy of the document;

generating a storage instruction for the copy of the document based on the document metadata of the copy of the document to restore the document;

determining, based on storage component attributes, at least one storage component of which the storage property or capability matches with the storage instruction to restore the document; and restoring the document by copying the copy of the document from the at least one storage component indicated by the cloud storage information to the at least one storage component determined.

13. The method according to claim 12, further comprising:

updating the cloud storage information associated with the copy of the document to indicate the at least one storage component to which the copy has been copied.

14. A cloud processor for a cloud storage system comprising a plurality of storage components, the cloud processor having means configured to perform functions in accordance with the method according to claim 1.

15. A cloud storage system, comprising:
a plurality of storage components; and
a cloud processor having means configured to perform functions in accordance with the method according to claim 1.

16. A non-transitory computer readable medium, comprising instructions which when executed by a cloud processor in a cloud storage system having a plurality of storage components configure the cloud processor so as to perform the method according to claim 1.

17. The method of claim 1, further comprising:
at the cloud processor:
restoring the first document on the occurrence of a failure in the at least one storage component, the restoring including:
generating a storage instruction for the first document based on retrieved first document metadata;
determining at least one storage component to restore the first document based on the storage property or capability of the at least one storage component that matches with the storage instruction; and
restoring the first document by copying the first document to the determined at least one storage component.

18. A cloud storage system, comprising:
a cloud processor communicatively connected to a plurality of storage components and having at least one non-transitory memory containing instructions causing the cloud processor to:
provide at least one storage component attribute for each of the plurality of storage components, the cloud processor representing a root of a tree, wherein the tree links the cloud processor and the plurality of storage components in the cloud storage system, the plurality of storage components comprising a hardware layer of storage devices, the hardware layer having a storage property defined using a storage component attribute of the at least one storage component attribute provided by the cloud processor;

receive, from a user computer, a first document and document metadata thereof, the document metadata defining a storage requirement of the first document, the storage requirement of the first document including a retention period;

responsive to receiving the first document from the user computer, generate a storage instruction for the first document based on the document metadata of the first document, the storage instruction executable by the cloud processor;

determine at least one storage component from the plurality of storage components linked to the cloud processor in the tree that has a defined storage property or capability that matches the storage instruction generated by the cloud processor for the first document, the determining comprising comparing a retention period of the at least one storage component and the retention period of the first document that is defined by the document metadata;

store the first document in the at least one storage component determined by the cloud processor according to the storage instruction generated by the cloud processor for the first document;

receive, from a content server automatically or responsive to a request by a user, new document metadata for the first document, the new document metadata for the first document updates the originally received document metadata for the first document;

responsive to receiving the new document metadata for the first document from the content server, generate a new storage instruction for the first document based on the new document metadata for the first document, the new storage instruction executable by the cloud processor;

determine, based on the storage component attributes, whether the storage property or capability of the at least one storage component at which the first document is stored matches with the new storage instruction thus generated by the cloud processor for the first document; and responsive to a match between the storage property or capability of the at least one storage component and the new storage instruction thus generated by the cloud processor for the first document, update the originally received document metadata for the first document with the new document metadata for the first document without moving the first document, otherwise:

determining based on storage component attributes at least one new storage component among the plurality of storage components linked to the cloud processor in the tree that has a defined storage property or capability that matches the new storage instruction thus generated by the cloud processor for the first document; and storing the first document in the at least one new storage component determined by the cloud processor as matching the new storage instruction thus generated by the cloud processor for the first document.

19. The system of claim 18, wherein the at least one non-transitory memory further comprises instructions causing the cloud processor to:

generate cloud storage information associated with the first document stored in the cloud storage system indicating the at least one storage component at which the first document is stored.

20. The system of claim 18, wherein the at least one non-transitory memory further comprises instructions causing the cloud processor to:
- restore the first document on the occurrence of a failure in the at least one storage component, the restoring including:
  - generate a storage instruction for the first document based on retrieved first document metadata;
  - determine at least one storage component to restore the first document based on the storage property or capability of the at least one storage component that matches with the storage instruction; and
  - restore the first document by copying the first document to the determined at least one storage component.

* * * * *

UNITED STATES PATENT AND TRADEMARK OFFICE
CERTIFICATE OF CORRECTION

| | |
|---|---|
| PATENT NO. | : 10,983,952 B2 |
| APPLICATION NO. | : 14/316579 |
| DATED | : April 20, 2021 |
| INVENTOR(S) | : Peter Ginzinger, Matthias Specht and Stefan Ochs |

It is certified that error appears in the above-identified patent and that said Letters Patent is hereby corrected as shown below:

In the Specification

Column 7, at Line 66, insert -- of -- between "one" and "the".

Signed and Sealed this
Nineteenth Day of July, 2022

Katherine Kelly Vidal
*Director of the United States Patent and Trademark Office*